Patented Aug. 7, 1945

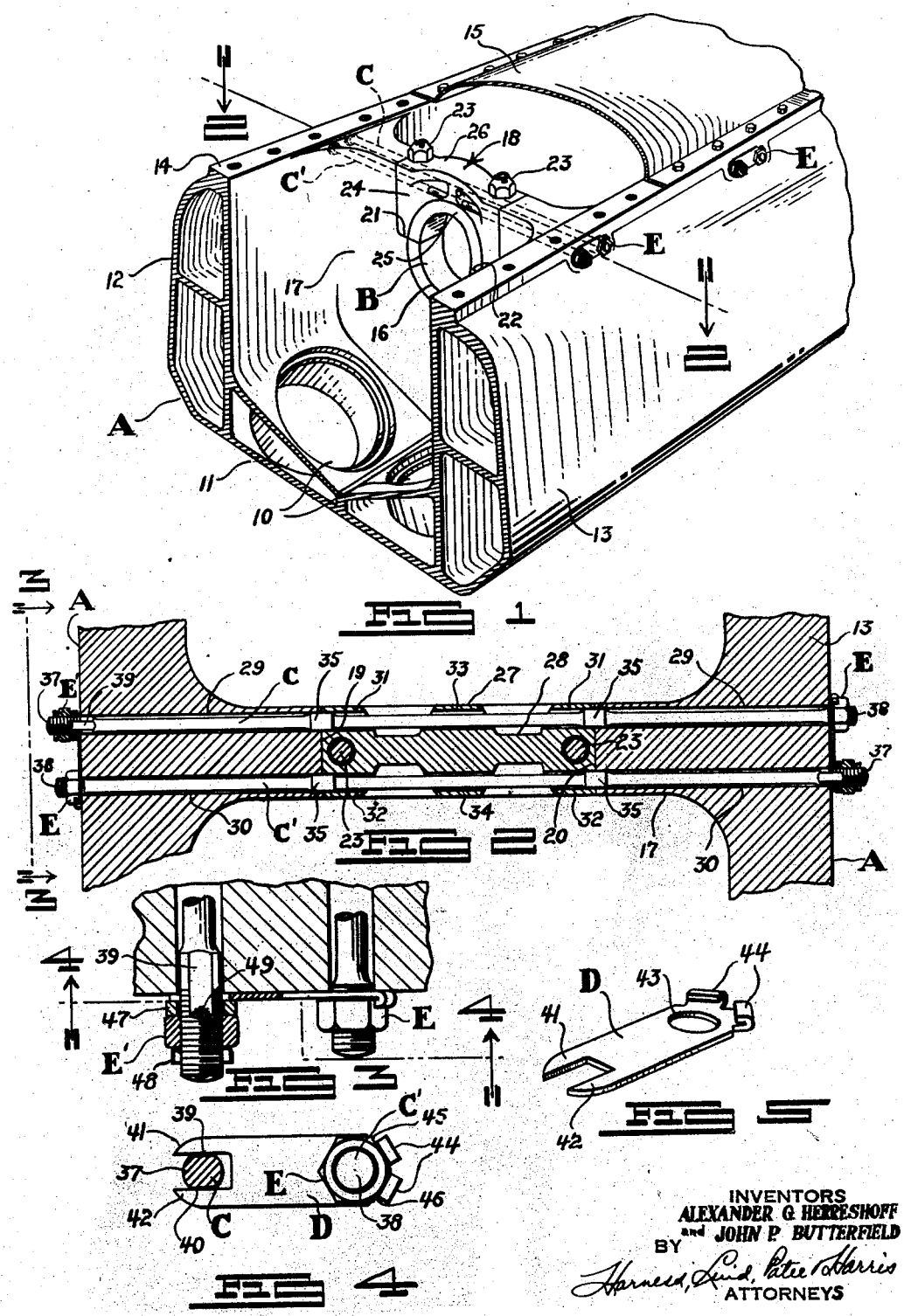

2,381,745

UNITED STATES PATENT OFFICE 2,381,745
COUPLING

Alexander G. Herreshoff, Grosse Pointe, and John P. Butterfield, Detroit, Mich., assignors to Chrysler Corporation, Highland Park, Mich., a corporation of Delaware Application November 28, 1941, Serial No. 420,856

14 Claims. (Cl. 151—32)

This invention relates to couplings and refers more particularly in the assembly and fastening together of portions or parts of structures, devices, machines, and machine elements. Our invention, in its more limited aspects, relates particularly to coupling or tie means for parts of engines under stress such as engine crankcase and crankshaft bearing structures.

One object of our invention is to provide an improved coupling for maintaining engine crankcase portions under relatively high stress preferably in conjunction with a main bearing cap secured between the crankcase portions. Couplings of this general character are employed in aircraft engines wherein it is important to maintain casing parts of very light weight while at the same time providing a high degree of strength and rigidity to take the high stresses involved in an engine of this type.

A further object is to provide a coupling embodying stressed tie-rod assemblies so arranged as to guard against subjecting the tie-rods to twisting load during final assembly of the coupling. We have more particularly provided means for inter-connecting a pair of tie-rods such that each cooperates with the other in preventing torsionally stressing the tie-rods as they are stressed in final assembly.

Another object is to provide improved locking means for the stress-imparting nuts threaded on the ends of a pair of coupling tie-rods.

Further objects and advantages of our invention will be more apparent as this specification progresses, reference being had to the accompanying drawing illustrating the principles of our invention and in which:

Fig. 1 is a sectional perspective view through the crankcase of an aircraft engine illustrating our coupling applied thereto.

Fig. 2 is a sectional plan view taken as generally indicated by line 2—2 of Fig. 1.

Fig. 3 is an enlarged view of one end portion of the tie-rods as seen in Fig. 2, the view being taken as indicated by line 3—3 of Fig. 2.

Fig. 4 is a detail sectional view of the Fig. 3 structure taken as indicated by line 4—4 of Fig. 3.

Fig. 5 is a perspective view of the stirrup between a pair of tie-rod assemblies.

Referring to the drawing we have illustrated our invention in the form of a crankcase and crankshaft bearing cap assembly of an inverted V-type aircraft engine. The crankcase A comprises a casting of aluminum alloy having cylinder openings 10 in the horizontal bottom casting cored portion 11 from which the cored side wall portions 12 and 13 extend upwardly. Each wall portion has an upper marginal face 14 for seating a pan or closure plate 15 which bridges the wall portions.

The engine crankshaft (not shown) operates in the chamber between side walls 12, 13 and at various points along the length of the engine the crankshaft is journalled in the crankcase. One of these journals is shown at B in Fig. 1 comprising a lower bearing segment 16 formed in the transverse web 17 which extends integrally between side walls 12, 13 and which is provided with a recess to receive the bearing cap 18. This web recess is defined by the parallel vertical faces or walls 19, 20 (Fig. 2) and the coplanar bottom walls 21, 22 all of which walls fit corresponding vertical and horizontal walls or faces of cap 18. A pair of stud assemblies 23 extend vertically through the respective boss portions 24 of cap 18 to connect the same with web 17.

The bearing cap is formed with an upper bearing segment 25 and between this segment and the upper wall 26, which connects bosses 24, there is a vertical stiffening web 27 extending axially of the bearing B and a vertical web 28 which also connects the bosses.

The wall portions 12 and 13 are each formed with longitudinally spaced pairs of transversely extending openings 29 and 30 at the web 17. The bearing cap has each of its bosses 24 formed with a pair of openings 31, 32 such that a stud 23 extends between each pair of openings and at right angles thereto. The web 27 is also formed with a pair of openings 33, 34.

The various openings are so arranged in relative alignment with each other as to accommodate a pair of coupling devices in the form of interchangeable tie-rods C and C'. Tie-rod C extends through aligned openings 29, 31 and 33 and tie-rod C' extends through aligned openings 30, 32 and 34. Each tie-rod has a plurality of relatively spaced enlarged locating portions 35. Each of the two portions 35 of one tie-rod C fits a pair of openings 29, 31 so as to bridge the abutting faces 19, 20 with the vertical faces of the cap 18. Likewise the other tie-rod C' has its two portions 35 engaging openings 30, 32 adjacent faces 19, 20. The remaining portions of each tie-rod are of reduced diameter except at the opposite ends which have enlarged threaded portions 37 and 38.

The tension-applying end portion 37 is somewhat longer than the abutment end portion 38 and is provided with non-circular portions or flats 39, 40 which fit the inner faces of prongs 41, 42 of a stirrup D such that relative rotation between the stirrup and interengaged tie-rod is prevented. The tie-rods C and C' are relatively oppositely disposed such that a pair of end portions 37, 38 project adjacent each other from each side wall portion 12, 13 at each location of a bearing B. The other end of each stirrup D has a circular opening 43 for sliding over a threaded end portion 38 and a pair of upstanding ears 44 adapted to fit a pair of side faces 45, 46 of an abutment or reaction nut E such that relative rotation between the stirrup and interengaged nut E is prevented. The ears 44 thus lock an associated nut E from turning on the tie-rod.

Each tie-rod portion 37 is adapted to receive a washer 47 outwardly adjacent the forked end of a stirrup D, a tensioning nut E' similar to nut E, and a lock washer 48 of any type suitable to prevent nut E' from turning on the threaded end portion 37 after final assembly.

The relationship of parts is such that it is impossible for the mechanic, in assembling the coupling, to make a mistake whereby twist might be imparted in the tie-rods C and C'. Where long rods of this character are employed under high tension it is most important that the rod be stressed in tension only, and not with accompanying torsion leading to failure of the tie-rods. As an assistance to the mechanic, one end of each tie-rod at the end portion 37 may bear some suitable identification, such as an "X" formed by an electric needle, the other ends 38 being free of such marking. All tensioning of the tie-rods must be made at this end as will presently be more apparent.

In the assembly of the coupling, after the bearing cap 18 has been installed in place, the mechanic pushes tie-rods C and C' through their respectively aligned openings so that the tension-applying end portions 37 project from opposite sides of the crankcase A. At each side wall 12 and 13 there will therefore be disposed an end portion 38 of one tie-rod and an end portion 37 of the other tie-rod. Each tie-rod is so positioned that the end portion 38 projects only slightly from its opening and the arrangement is such that, under such conditions, the inner end portion of the flats 39, 40 at the other end of the tie-rods will lie adjacent the outer end of the associated opening.

With the tie-rods so positioned, the stirrups D may be applied. In applying each stirrup, the forks 41, 42 are engaged with the exposed inner end portions of the flats 39, 40 while the opening 43 of the stirrup is passed over the slightly extending end portion 38 of the adjacent tie-rod. If desired, as an alternative procedure, each stirrup D may be applied at its forked end, as aforesaid, while the end portion 38 of an adjacent tie-rod is moved to a position just within its associated opening and then pushed through stirrup opening 43. After one stirrup is applied then the other may be applied by this same alternative method.

The stirrups D are now interengaged with the adjacent end portions of tie-rods C and C' at each side of the crankcase, with the stirrups bridging the respective end portions of the tie-rods. The next step in the assembly comprises pushing each end portion 37 as far as it will go which will be until the outer flaring or shouldered end portion 49 (Fig. 3) is brought against the forks 41, 42 of an associated stirrup. The shouldered flares 49 are formed as an incident to forming flats 39, 40 in the end portion 37 of each tie-rod and serve as stops limiting movement of the tie-rods when pushed as aforesaid. This will expose the threaded end portions 38 of each rod outwardly beyond the opening 43 of the associated stirrup D.

The next step comprises installing an abutment nut E by hand threading the same on each exposed end portion 38 until the nut meets the ears 44 of an associated stirrup, the nuts being positioned so that, as a next step, the tie-rods may be oppositely pushed in at their ends 38 thereby causing a pair of ears 44 to lockingly engage the respective nuts E as illustrated.

Then a washer 47 and tensioning nut E' are assembled on the then exposed ends 37 of each tie-rod and the nuts E' tightened by wrench to impart the desired tension in the tie-rods after which the lock nuts or washers 48 are applied to securely hold nuts E' from unthreading. During operation of each tensioning nut E' at one of the side walls, the abutment nut E holds the opposite end of tie-rod at the opposite side wall.

It will be apparent that, on assembly of the tie-rods C and C' with the stirrups D and nuts E and E', only the nuts E' can be turned to impart tension to the tie-rods because the ears 44 will prevent any turning of nuts E. Further, when nuts E' are tightened the tie-rods are securely held against twist by the forks 41, 42 engaging the tie-rods at portions thereof disposed immediately adjacent nuts E' and the outer walls of the crankcase side portions 12 and 13. During tightening of each nut E', any twisting tendency in the associated tie-rod is resisted by the associated stirrup D reacting at opening 43 as a shearing stress on the adjacent end portion 38 of the other tie-rod. Nuts E are held in place by reason of the ears 44 and therefore do not need any further locking means.

By reason of our coupling, the crankcase side walls 12 and 13 are rigidly tied together along with a bearing cap 18 under compression transversely between the side walls, it being understood that a similar coupling is located at each crankshaft bearing B where the crankcase is under severe load.

We claim:

1. A coupling for urging a pair of bodies toward each other, said bodies having two sets of aligned openings, a tie-rod extending through each of said sets of openings, means rotatably operable on one end of each of said tie-rods for tensioning said tie-rods whereby to urge said bodies toward each other, means bridging opposite end portions of said tie-rods adjacent each of said bodies, each of said bridging means comprising a member non-rotatably engaging said one end of one of said tie-rods beneath and juxtaposed said tensioning means and arranged to transfer rotative tendency of this tie-rod so as to react in shear on the other tie-rod during said rotary operation of said tensioning means the other ends of said tie-rods having abutment stops for axial movement, engaged by and held from rotation by said bridging means during tensioning of said rods.

2. A coupling for urging a pair of bodies toward each other, said bodies having two sets of aligned openings, a tie-rod extending through each of said sets of openings, a tensioning nut threadedly engaging one end portion of each of said tie-rods for tensioning said tie-rods whereby to urge said bodies toward each other, an abutment nut threadedly engaging the other end portion of each of said tie-rods, means bridging opposite end portions of said tie-rods adjacent each of said bodies, each of said bridging means comprising a member connected with and fixed against rotation with respect to the tensioning-nut-engaged end portion of one of said tie-rods beneath and juxtaposed said tensioning nut and having a portion thereof in shear transferring relationship with the abutment-nut-engaged end portion of the other of said tie-rods and a portion holding said abutment nuts from rotation during tensioning of said tie-rods.

3. A coupling for urging a pair of bodies toward each other, said bodies having two sets of aligned openings, a tie-rod extending through each of said sets of openings, a tensioning nut threadedly engaging one end portion of each of said tie-rods for tensioning said tie-rods whereby to urge said bodies toward each other, an abutment nut threadedly engaging the other end portion of each of said tie-rods, means bridging opposite end portions of said tie-rods adjacent each of said bodies, each of said bridging means comprising a stirrup having one end thereof forked to provide a non-rotative connection with the tensioning-nut-engaged end portion of one of said tie-rods, beneath and juxtaposed said tensioning nut and having its other end formed with an opening through which the abutment-nut-engaged end portion of the other of said tie-rods extends and in which it may fully rotate, said stirrup also having means for holding said abutment nut from rotation.

4. A coupling according to claim 3, each of said stirrups having a portion thereof adapted to engage an associated abutment nut so as to prevent rotation of this nut relative to the tie-rod end portion engaged thereby during tensioning of said tie-rods.

5. A coupling for urging a pair of bodies toward each other, said bodies having two sets of aligned openings, a tie-rod extending through each of said sets of openings, a tensioning nut threadedly engaging one end portion of each of said tie-rods for tensioning said tie-rods whereby to urge said bodies toward each other, an abutment nut threadedly engaging the other end portion of each of said tie-rods, means bridging opposite end portions of said tie-rods adjacent each of said bodies, each of said bridging means comprising a member fixed against rotation with respect to the tensioning-nut-engaged end portion of one of said tie-rods below and juxtaposed the tensioning nut and having a portion thereof in locking relation with respect to the abutment nut of the other of said tie-rods to prevent rotation of the abutment nuts during tensioning of the tie-rods.

6. A coupling for stressing a pair of bodies toward each other, said bodies having two sets of aligned openings, a pair of interchangeable tie-rods extending through each of said sets of openings, each of said tie-rods having a tension-applying threaded end portion and having an abutment member threadedly carried by its opposite end in thrusting relationship with one of said bodies, said tie-rods extending in relatively opposite directions such that the tension-applying end portion of each of said tie-rods projects from one of said bodies with which the abutment member of the other of said tie-rods is in thrusting relationship, a nut rotatably engaging each of said tension applying threaded end portions for tensioning said tie-rods thereby to stress said bodies toward each other, and means providing an interconnection between said tie-rods adjacent each of said nuts so constructed and arranged as to hold the said tension-applying threaded end portions of said tie-rods against rotation beneath and juxtaposed said nuts when said nuts are rotated for tensioning said tie-rods as aforesaid and to hold said abutment member from rotation during said tensioning.

7. A coupling for stressing a pair of bodies toward each other, said bodies having two sets of aligned openings, a pair of interchangeable tie-rods extending through each of said sets of openings, each of said tie-rods having a tension-applying threaded end portion and an abutment-receiving threaded portion adjacent its opposite end, a tension-applying nut engaging each of said tension-applying threaded end portions, an abutbent nut engaging each of said abutment-receiving threaded end portions and disposed in thrusting relationship with respect to one of said bodies, said tie-rods extending in relatively opposite directions so as to dispose each of said tension-applying nuts in thrusting relationship with respect to that one of said bodies with which the abutment nut of the other of said tie-rods is in thrusting relationship as aforesaid, and a pair of members bridging said tie-rods respectively adjacent each of said tension-applying nuts, each of said members having a portion thereof locking one of said abutment nuts against rotation with respect to the tie-rod end portion on which it is threaded as aforesaid and having another portion thereof adapted to hold the tension-applying threaded end portion of the other tie-rod against rotation beneath its tensioning nut during application of tension thereto by its said tension-applying nut.

8. A coupling for stressing a pair of bodies toward each other, said bodies having two sets of aligned openings, a pair of interchangeable tie-rods extending through each of said sets of openings, each of said tie-rods having a tension-applying threaded end portion and an abutment-receiving threaded portion adjacent its opposite end, a tension-applying nut engaging each of said tension-applying threaded end portions, an abutment nut engaging each of said abutment-receiving threaded end portions and disposed in thrusting relationship with respect to one of said bodies, said tie-rods extending in relatively opposite directions so as to dispose each of said tension-applying nuts in thrusting relationship with respect to that one of said bodies with which the abutment nut of the other of said tie-rods is in thrusting relationship as aforesaid, each of said tie-rods having a pair of flats formed thereon adjacent its said tension-applying threaded end portion, and a pair of stirrups bridging said tie-rods respectively adjacent each of said tension-applying nuts, each of said stirrups having a forked end portion engaging a pair of flats and an opening adjacent its other end through which one of said abutment-receiving end portions extends and in which it can freely rotate, each of said stirrups having an ear engaging a side face of one of said abutment nuts.

9. Tie means for biasing together side walls of an engine crankcase, comprising, a pair of interchangeable tie-rods extending in relatively opposite directions through said side walls and projecting therebeyond to present a pair of tie-rod end portions adjacent the outer surface of each of said side walls, a pair of nuts respectively threaded on the projecting end portions adjacent each side wall, and means providing an interconnection between the projecting tie-rod end portions adjacent each of said side walls so constructed and arranged as to lock one nut of each pair against rotation while leaving the other free to rotate to tension said tie-rods thereby preventing tensioning of said tie-rods by said nuts at the same side wall, said means including structure engaging said tie-rod and juxtaposed said tensioning nut to prevent rotation of said end during tensioning of the rod.

10. In a journal bearing structure including a pair of relatively spaced side walls, a web connecting said side walls having a recess formed with a bearing portion and with oppositely disposed faces adjacent said bearing portion, a bearing cap positioned in said recess and having opposed faces between said opposed faces of said recess, and a pair of substantially parallel elongated openings extending through said side walls, cap, and faces, a coupling for pre-stressing said bearing structure comprising a pair of cooperating tie-rods one extending through each of said openings and having a portion intermediate its ends extending between said side walls, abutment means rotatively engaging one end of one of said tie-rods adjacent one of said side walls and similar means engaging the opposite end of the other of said pair of tie-rods adjacent said other side wall, means rotatably engaging the ends of said tie-rods opposite said abutment means for tensioning each of said tie-rods whereby to stress said structure, and means engaging and bridging said tie-rods at each of said side walls, said bridging means being so arranged and constructed as to hold the end portions of said tie-rods having said tensioning means against rotation relative to said bridging means whereby said intermediate portion of said tie-rods may be tensioned without being subject to torsional stressing during rotation of said tensioning means, and as to hold said abutment means from rotation relative to said bridging means whereby said tensioning means only may be subject to rotation for tensioning said tie-rods to stress said bearing structure, each of said tie-rods serving to prevent relative rotation of said bridging means by the other and serving as the reaction for rotating tendency of the other.

11. In a journal bearing structure according to claim 10, wherein each of said bridging means comprises a stirrup non-rotatably engaging one of said tie-rods at its end having said tensioning means.

12. In a journal bearing structure according to claim 10, wherein each tie-rod has a flat at its end carrying said tensioning means, and each of said briding means comprises a stirrup non-rotatably engaging the said flat of one of said tie-rods and having a preformed portion non-rotatably engaging said abutment means.

13. A coupling for urging a pair of bodies toward each other, said bodies having two substantially parallel sets of aligned openings, a tie-rod extending through each of said sets of openings, abutment means rotatably engaging one end of each of said tie-rods, means rotatably engaging the opposite end of each of said tie-rods for tensioning said tie-rods whereby to urge said bodies together, and means bridging the said tie-rods adjacent each of said bodies where said tie-rods extend from said openings, said bridging means being so arranged and constructed as to hold said tie-rods from rotation adjacent said tensioning means and during rotation of the latter and to hold said abutment means from rotation during tensioning operations whereby to limit rotation to said tensioning means, the portions of said tie-rods adjacent said abutment means being free to rotate relative to said bridging means.

14. A coupling for urging a pair of bodies toward each other, said bodies having two substantially parallel sets of aligned openings, a tie-rod extending through each of said sets of openings, abutment means rotatably engaging one end of each of said tie-rods, means rotatably engaging the opposite end of each of said tie-rods for tensioning said tie-rods whereby to urge said bodies together, and bridging means comprising a stirrup, extending between adjacent end portions of said tie-rods adjacent each of said bodies, each stirrup having a forked portion at one end thereof in non-rotatable engagement with the said opposite end of one of said tie-rods, and a second portion at the opposite end thereof in shear transferring relationship with respect to the said one end of the other of said tie-rods and engaging said rotatable abutment means to hold said abutment means from rotation during tensioning operations whereby to limit rotation to said tensioning means.

ALEXANDER G. HERRESHOFF.
JOHN P. BUTTERFIELD.